United States Patent [19]

Tokuno et al.

[11] Patent Number: 4,600,841
[45] Date of Patent: Jul. 15, 1986

[54] APPARATUS FOR DETECTING MARKS ON A RUNNING WEB

[75] Inventors: Masateru Tokuno, Nishinomiya; Yasuharu Mori, Amagasaki, both of Japan

[73] Assignee: Rengo Co., Ltd., Osaka, Japan

[21] Appl. No.: 515,257

[22] Filed: Jul. 19, 1983

[30] Foreign Application Priority Data

Aug. 6, 1982 [JP] Japan .................................. 57-137789

[51] Int. Cl.[4] ...................... G01N 21/86; G05B 19/29
[52] U.S. Cl. .................................... 250/548; 250/557
[58] Field of Search .............. 250/548, 557, 561, 571; 356/375, 400, 429; 318/640, 603

[56] References Cited

U.S. PATENT DOCUMENTS 4,067,760 1/1978 Nelson ................................ 250/548
4,243,925 1/1981 Gnuechtel ........................... 250/561

Primary Examiner—Edward P. Westin
Attorney, Agent, or Firm—Wenderoth, Lind & Ponack

[57] ABSTRACT

Mark detector for detecting marks on a running web distinguished from any printed letter or pattern or any printing smudge. The width of mark segments and the distance between them are determined and, if they are within preset ranges, a mark detection signal is given. A delayed signal generator and a false signal generator are provided.

8 Claims, 5 Drawing Figures

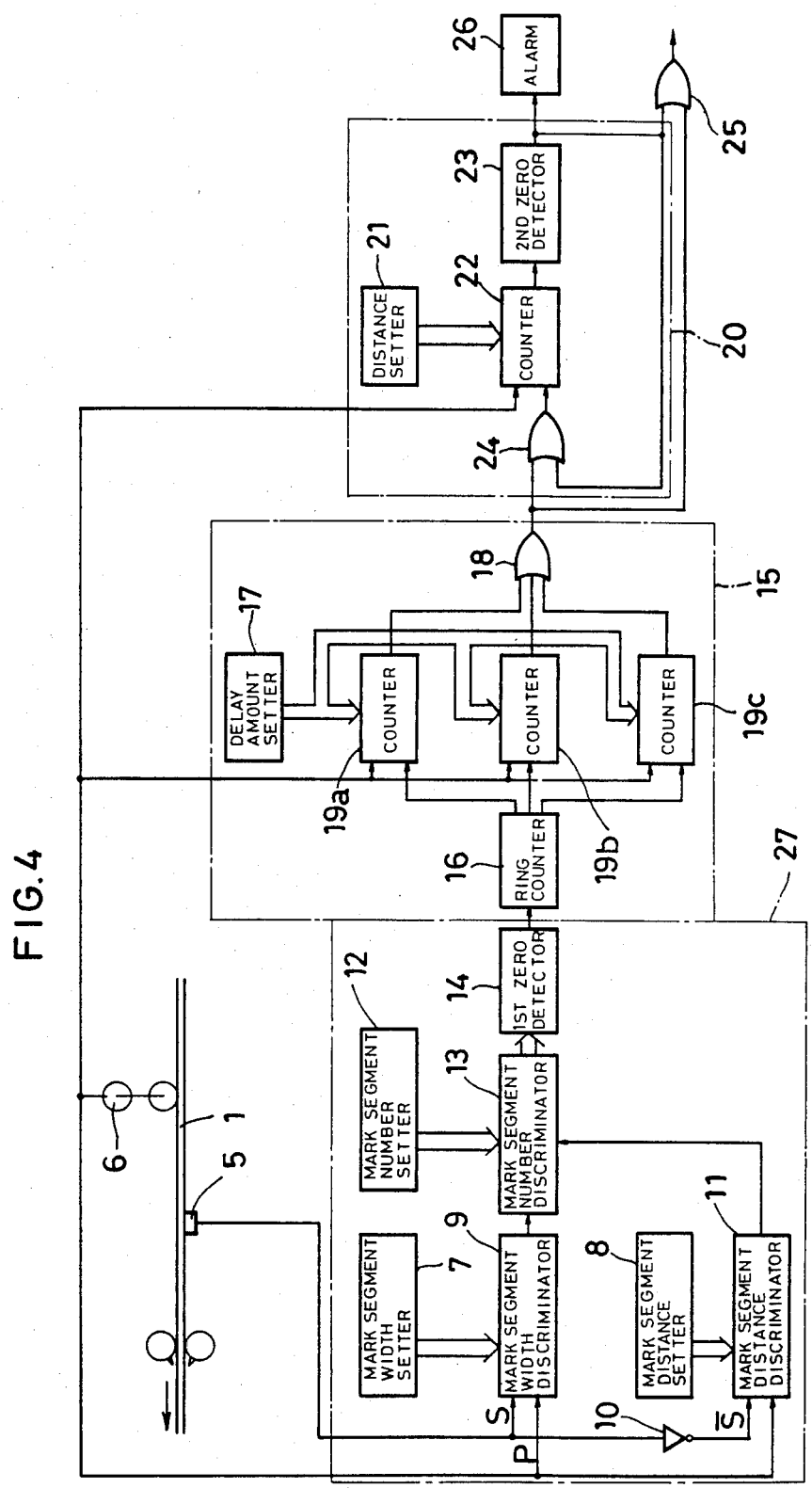

APPARATUS FOR DETECTING MARKS ON A RUNNING WEB

The present invention relates to an apparatus for detecting marks on a running web e.g. a corrugated fiberboard web running at a high speed. For example, it distinguishes cutting marks on the web from other printed letters or patterns and gives a mark detection signal to a cutter each time a cutting mark comes.

In manufaturing corrugated fiberboards from a linerboard web on which letters and/or patterns are preprinted, the cutting marks preprinted on the web are detected and the web is cut automatically and correctly on the marks in response to the mark detection signals. If any letter or pattern were mistaken for the cutting mark, the web would be cut at incorrect positions and a large number of defective corrugated fiberboards be produced. This problem is common with any preprinted web materials which have to be cut or processed at predetermined points.

In cases where as shown in FIG. 1, cutting marks 2 are printed along one edge of a web 1 off a printed area 3 including letters and/or patterns, there is no problem of mistaking the printed letter or pattern for a cutting signal. However, in cases where as shown in FIG. 2, the printed area 3 partially overlaps the cutting marks 4, if the marks are scanned on a line X—X, the printed letter or pattern might be mistaken for a cutting mark. Also, any printing spot or smudge might be detected as a cutting mark.

In accordance with the present invention, by measuring the distance covered by the web while the mark sensor is detecting an object and that while it is not detecting, the marks can be accurately distinguished from any printed letter or pattern or printing smudge.

In accordance with the present invention, because a delayed signal generator is provided, the mark sensor may be provided at any position remote from a processing machine such as a rotary cutter.

In accordance with the present invention, a false signal generator is provided to give notice and/or give a false signal if no-mark area on the web e.g. at its leading or trailing end is running.

An object of the present invention is to provide a mark detector for a running web material which each time a cutting mark comes, distinguishes it from any preprinted letter or pattern and gives a mark detection signal.

Other objects and features of the present invention will become apparent from the following description taken with reference to the accompanying drawings, in which:

FIG. 4 is a block diagram of an embodiment of the present invention; and

Figure 1:
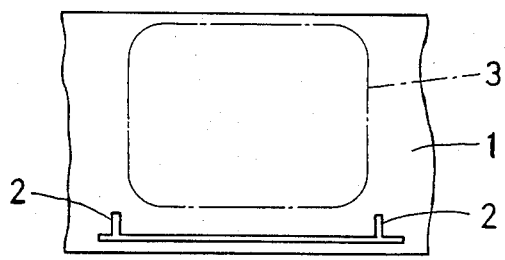
FIG. 1 is a plan view of a web having cutting marks thereon.
Figure 2:
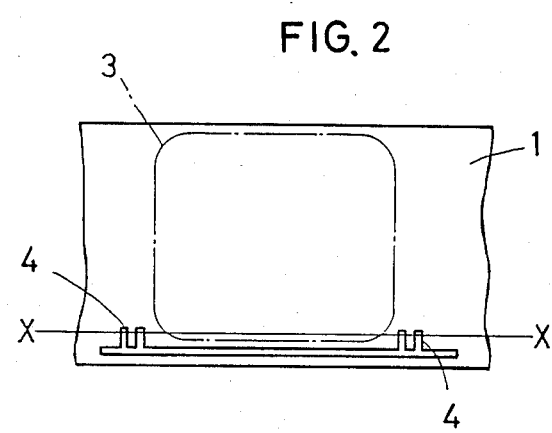
FIG. 2 is a plan view of another example of a web having cutting marks.
Figure 3:
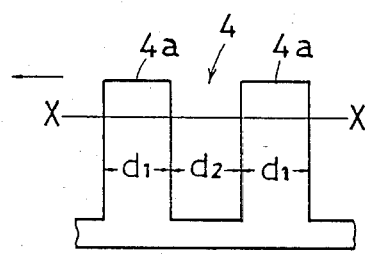
FIG. 3 is an enlarged view of a cutting mark put on the web shown in FIG. 2.

Referring to FIGS. 2 and 3, on a running web 1 cutting marks 4 are preprinted at predetermined positions to indicate the cutting positions. In the preferred embodiment, each cutting mark 4 consists of two mark segments 4a each having a width $d_1$ and spaced at a distance $d_2$.

Referring to FIG. 4, a sensor 5 for detecting the cutting mark is provided under the web 1 which runs in the direction of arrow. The sensor 5 gives a detection signal S which is at a high level only while it is sensing a mark segment 4a or any other printed part. A distance detector 6 is provided to detect the distance for which the web has run and give a pulse signal P having pulses, the number of which is proportional to the distance.

A mark segment width setter 7 is provided to set two values $D_1$ and $D_1'$ ($D_1 \geq D_1'$) which correspond to the width $d_1$ of each mark segment 4a of the mark 4. Similarly, a mark segment distance setter 8 is provided to set two values $D_2$ and $D_2'$ ($D_2 \geq D_2'$) which correspond to the distance $d_2$ between two mark segments 4a.

Figure 5:
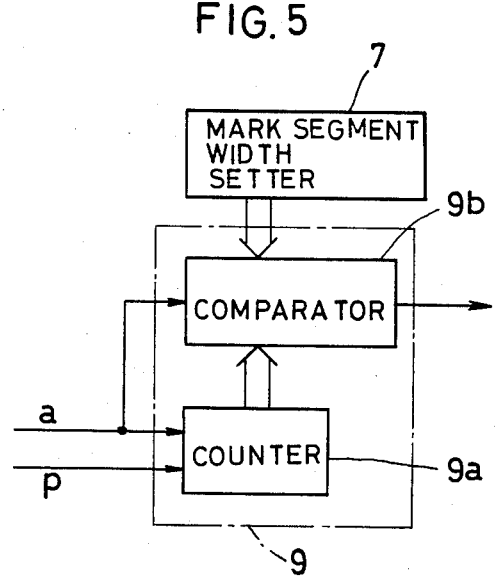
FIG. 5 is a block diagram of a portion of the circuit shown in FIG. 4.

A mark segment width discriminator 9 receives the pulse signal P from the distance detector 6 in response to the rise of the detection signal S from the sensor 5 and gives an equality signal if the number of pulses $N_1$ given during the period from the rise to the fall of the signal S is between the preset values $D_1$ and $D_1'$ from the mark segment width setter 7 (i.e. $D_1' \leq N_1 \leq D_1$). As shown in FIG. 5, the mark segment width discriminator 9 may comprise a counter 9a which is reset upon the rise of the detection signal S to count the pulse signal P only while the signal S is at a high level, and a comparator 9b which compares the count $N_1$ of the counter 9a with the preset values $D_1$ and $D_1'$ upon the fall of the detection signal S and gives an equality signal only when $D_1' \leq N_1 \leq D_1$.

Similarly, a mark segment distance discriminator 11 receives the pulse signal P from the distance detector 6 and the detection signal S through an inverter 10 and gives a non-equality signal if the number $N_2$ of pulses given during the period from the fall to the rise of the signal S is not between the preset values $D_2$ and $D_2'$ from the mark segment distance setter 8 (i.e. $N_2 < D_2'$ or $D_2 < N_2$). Like the discriminator 9, the mark segment distance discriminator 11 may comprise a counter which is reset upon the fall of the detection signal S to count the pulse signal P only while the detection signal S is at a low level, and a comparator which compares the count $N_2$ of the above-said counter with the preset values $D_2$ and $D_2'$ and gives a non-equality signal only when $N_2 < D_2'$ or $D_2 < N_2$.

A mark segment number discriminator 13 is preset by a mark segment number setter 12 to the number of mark segments, that is, 2 in this embodiment, in response to the non-equality signal from the mark segment distance discriminator 11. In response to the equality signal from the mark segment width discriminator 9, the preset value is reduced by one. When the value on the discriminator 13 becomes zero, a first zero detector 14 gives a mark detection signal.

Now, let us assume that the mark segment number discriminator 13 is preset to "2" through the mark segment number setter 12. When the sensor 5 detects a mark segment, a printed part or a printing smudge so that a detection signal S rises, the mark segment width discriminator 9 will start the counting of pulse signal P from the distance detector 6 and stop it upon the fall of the detection signal. If the count $N_1$ then is $D_1' \leq N_1 \leq D_1$, the discriminator 9 judges it to be a mark segment and gives an equality signal. In response to the signal, the value on the mark segment number discriminator 13 is reduced from "2" to "1". If $N_1 < D_1'$ or $D_1 > N_1$ since the detected object is a mere smudge or printed part, the discriminator 9 will not give an equality signal. Thus the value on the discriminator 13 remains at "2".

After the count on the discriminator 13 has changed from "2" to "1", upon the fall of the detection signal S the mark segment distance discriminator 11 starts the counting of the pulse signal P from the distance detector 6 and stops it upon the rise of the next detection signal S. If the count $N_2$ then is $D_2' \leq N_2 \leq D_2$, the discriminator 11 does not give a non-equality signal. Thus the mark segment number discriminator 13 will not be reset but hold the value "1".

When the sensor 5 detects the next printed part to give the detection signal S, the mark segment width discriminator 9 will start the counting of pulse signal P again. If the count $N_1$ at the fall of the detection signal is $D_1' \leq N_1 \leq D_1$, the discriminator 9 will give an equality signal so that the value on the discriminator 13 will be reduced from "1" to "0". Simultaneously the first zero detector 14 will give a mark detection signal. This means that the mark detector according to the present invention has discriminated the detected object to be nothing but the cutting mark on which the web is to be cut.

Normally the next mark comes with a much larger distance than the distance $d_2$ between the mark segments. Therefore, the next count $N_2$ will usually be larger than $D_2$. If the count $N_2$ is not within the preset range ($N_2 < D_2'$ or $D_2 > N_2$), the discriminator 11 will give a non-equality signal to the mark segment number discriminator 13 to reset it at "2" preset on the mark segment number setter 12. Now, the mark detector is ready for discrimination as to whether the next detected object is a cutting mark or not.

Now, suppose that a printing smudge having two peaks has come toward the sensor 5. If the width of the first peak should be substantially equal to $d_1$, the peak will be judged to be a mark segment so that the count of the mark segment number discriminator 13 will change from "2" to "1". Furthermore, even if the distance between two peaks should be substantially equal to $d_2$, the count on the discriminator 13 will remain at "1" unless the width of the second peak is substantially equal to $d_1$. It is hardly possible that the next mark 4 will come after the second peak of the printing smudge with a distance equal to $d_2$. Thus, the mark segment number discriminator 13 will be reset to "2" eventually. Thus, no mark detection signal will come from the first zero detector 14.

In the embodiments, not a single but two values $D_1$, $D_1'$, and $D_2$, $D_2'$ are set by the mark segment width setter 7 and the mark segment distance setter 8, respectively. This is to set some allowable ranges for the segment width and the distance between the segments, thereby preventing a cutting mark having a blurred area or marginal zone from being judged as a printing smudge.

Next, a delayed signal generator will be described which gives a delayed mark detection signal when the web has run for a predetermined distance after the cutting mark has been sensed. The sensor 5 is usually provided at a suitable position near a processing machine such as a rotary cutter so that the machine can be actuated upon the mark detection signal. But, it cannot sometimes be provided at such a suitable position for some reason but at a position remote from the processing machine. In such a case, a delayed signal generator is required to delay the mark detection signal so that the web will be cut just on the cutting mark.

Referring to FIG. 4, the delayed signal generator 15 receives the mark detection signal from the first zero detector 14 and the pulse signal P from the distance detector 6. It delays the giving of the mark detection signal until the web has run for a predetermined distance. It comprises a ring counter 16 for counting the mark detection signal, a delay amount setter 17 for setting the distance to be run by the web before the giving of the delayed signal, and a plurality of counters 19a, 19b, 19c from among which one counter is selected and reset, each time the count of the ring counter 16 changes, to count the pulse signal from the distance detector 6 and gives a delayed mark detection signal through an OR curcuit 18 when its count becomes equal to the value preset on the setter 17.

The number of the counters 19 depend on the minimum distance between the marks and the distance between the optimal mark detection position and the actual mark detection position. The number of bits for the ring counter 16 should be equal to the number of the counters 19.

Next, a false signal generator will be described which gives a false mark detection signal if no mark is detected even though the web has run for a predetermined length which corresponds to the distance between the marks. The web to be cut sometimes has at its leading or trailing end a blank space where no cutting mark or pattern is printed. Since no mark is detected and thus no cutting signal is given, a very long strip would be discharged from the machine. Such a long strip is difficult to handle in subsequent steps. The false signal generator is provided to prevent such too long strips from being produced.

The false signal generator 20 receives the delayed mark detection signal and the pulse signal from the distance detector 6. It gives a false mark detection signal when the web has run for a predetermined distance (which is longer than the distance between the marks) after it has received the delayed mark detection signal or a machine start signal. It comprises a distance setter 21 for setting a value larger by a predetermined distance than the distance between the marks 4, a counter 22 which reads the value preset on the distance setter 21 each time it receives a reset signal from an OR circuit 24, and subtracts the pulse signal P from the distance detector 6 from the preset value, a second zero detector 23 which gives a false mark detection signal when the count of the counter 22 has become zero, and the OR circuit 24 which gives a reset signal to the counter 22 when it receives either the false mark detection signal or the delayed mark detection signal.

When an OR curcuit 25 receives either the false mark detection signal from the second zero detector 23 or the delayed mark detection signal, it gives a signal for actuating a processing machine such as a rotary cutter. The false mark detection signal is given to an alarm 26, too, to actuate it to give notice that the web portion with no cutting mark is running.

Conveniently, an indicator should be provided near the mark segment width setter 7 to indicate the count on the counter 9a for the mark segment width discriminator 9. Similarly, an indicator for a counter for the mark segment distance discriminator 11 should be provided near the mark segment distance setter 8.

Although in the preferred embodiment each mark 4 has two mark segments 4a, it may consist of three or more segments. Even marks having a single mark segment can be detected by setting the number of segment to "1" on the setter 12 and setting the values $D_2$, $D_2'$ (for the distance between the mark segments) on the setter 8 to values other than zero and smaller than the minimum distance between the marks.

The first zero detector 14 and the second zero detector 23 may be omitted. In this case, a signal will be given as soon as the count on the mark segment number discriminator 13 or the counter 22 has become zero.

Although in the preferred embodiment the selected counter 19 counts the pulse signal P from the distance detector 6 and gives a delayed signal when its count becomes equal to the value preset by the setter 17, it may be adapted to subtract the pulse signal P from the preset value given by the setter 17 and to give a delayed signal when its count becomes zero.

The mark segment number discriminator 13 and the counter 22 may be adapted to be reset in response to the signal from the discriminator 11 and the signal from the OR curcuit 24, respectively, to count the signal from the discriminator 9 and the pulse signal P from the distance detector 6, respectively, and give a mark detection signal and a false mark detection signal, respectively, when their count becomes equal to the values preset on the setter 12 and the setter 21, respectively.

If each mark 4 has a plurality of mark segments 4a, all the segments may not have the same width. If the mark 4 has three or more segments 4a, all the distances between the segments may not be the same. In such cases, the preset values on the mark segment width setter 7 and the mark segment distance setter 8 have to be changed with the count on the mark segment number discriminator 13 to ensure satisfactory detection.

The mark detector according to the present invention may comprise only the mark detection unit 27 (FIG. 4), comprise the mark detection unit and the delayed signal generator 15, or comprise the mark detection unit and the false signal generator 20. In the last-mentioned case, the mark detection signal, not the delayed mark detection signal, is adapted to be given to the false signal generator 20.

As the mark sensing means for generating a mark detection signal, a television camera may be used. In this case, the image from the television camera is stored, and the width and number of the mark segments and the distance between the mark segments are determined from the stored data, and a mark detection signal is given if the width and the distance are within the preset ranges and the number of the segments reaches the preset number. An image sensor or any other sensor may be used as the mark sensing means.

What are claimed are:

1. A mark detector for detecting marks put on a running web with spacings therebetween, said marks each having at least one mark segment, comprising:
    a sensor for sensing an object which is said mark segment or a printed or smudged area on the web;
    a distance detecting means for detecting the distance for which the web has run; and
    a mark detecting means which starts to count a signal output from said distance detecting means in response to a signal output from said sensor, and which outputs a mark detection signal only if the following three conditions are met; (1) the width of a detected object is within a preset first range corresponding to the width of said mark segment; (2) the distance between detected objects is within a preset second range corresponding to the distance between said mark segments, and (3) the number of detected objects has become equal to a preset number of mark segments of which each mark consists.

2. The mark detector as claimed in claim 1 wherein said mark detecting means comprise:
    a mark segment width discriminating means for outputting an equality signal only when the distance detected by said distance detecting means during a period while said sensor is sensing an object is within said preset first range;
    a mark segment distance discriminating means for outputting a non-equality signal only when the distance detected by said distance detecting means during a period while said sensor is not sensing an object is not within said preset second range; and
    a mark segment number discriminating means for counting said equality signal from said mark segment width discriminating means after it has received said non-equality signal from said mark segment distance discriminating means and for outputting a mark detection signal when its count has become equal to said preset number of mark segments.

3. A mark detector as claimed in claim 1, further comprising a delayed signal generating means which starts to count the signal from said distance detecting means in response to said mark detection signal and which outputs a delayed mark detection signal when its count becomes equal to a first predetermined value.

4. A mark detector as claimed in claim 1, further comprising a false signal generating means which starts to count the signal from said distance detecting means in response to said mark detection signal or a start signal and which outputs a false mark detection signal when its count becomes equal to a second predetermined value which corresponds to a distance which is larger than the distance between the marks.

5. A mark detector as claimed in claim 1, further comprising a delayed signal generating means which starts to count the signal from said distance detecting means in response to said mark detection signal and which outputs a delayed mark detection signal when its count becomes equal to a first predetermined value, and a false signal generating means which starts to count the signal from said distance detecting means in response to said delayed mark detection signal or a start signal and which outputs a false mark detection signal when its count becomes equal to a second predetermined value which corresponds to a distance which is larger than the distance between the marks.

6. A mark detector as claimed in claim 2, futher comprising a delayed signal generating means which starts to count the signal from said distance detecting means in response to said mark detection signal and which outputs a delayed mark detection signal when its count becomes equal to a first predetermined value.

7. A mark detector as claimed in claim 2, further comprising a false signal generating means which starts to count the signal from said distance detecting means in response to said mark detection signal or a start signal and which outputs a false mark detection signal when its count becomes equal to a second predetermined value which corresponds to a distance which is larger than the distance between the marks.

8. A mark detector as claimed in claim 2, further comprising a delayed signal generating means which starts to count the signal from said distance detecting means in response to said mark detection signal and which outputs a delayed mark detection signal when its count becomes equal to a first predetermined value, and a false signal generating means which starts to count the signal from said distance detecting means in response to said delayed mark detection signal or a start signal and which outputs a false mark detection signal when its count becomes equal to a second predetermined value which corresponds to a distance which is larger than the distance between the marks.

* * * * *